United States Patent [19]
Petit et al.

[11] Patent Number: 6,071,328
[45] Date of Patent: Jun. 6, 2000

[54] PSA PROCESS AND APPARATUS FOR THE SEPARATION OF A GASEOUS MIXTURE

[75] Inventors: Pierre Petit, Verrieres-le-Buisson, France; Philippe Andreani, Houston, Tex.; Christian Monereau, Paris, France

[73] Assignee: L'Air Liquide, Societe Anonyme pour l'Etude et l'Exploitation des Procedes Georges Claude, Paris Cedex, France

[21] Appl. No.: 09/065,562

[22] Filed: Apr. 24, 1998

[30] Foreign Application Priority Data

Jun. 9, 1997 [FR] France ................................. 97 07117

[51] Int. Cl.$^7$ ............................................... B01D 53/053
[52] U.S. Cl. .............................. 95/98; 95/101; 95/105; 95/130
[58] Field of Search ................... 95/96–98, 100–105, 95/130, 138; 96/108, 130, 144

[56] References Cited

U.S. PATENT DOCUMENTS

| | | | |
|---|---|---|---|
| 3,788,036 | 1/1974 | Lee et al. ................................ | 55/25 |
| 4,013,429 | 3/1977 | Sircar et al. .......................... | 95/130 X |
| 4,331,455 | 5/1982 | Sato ...................................... | 95/130 X |
| 4,449,990 | 5/1984 | Tedford, Jr. .......................... | 95/102 X |
| 4,472,177 | 9/1984 | Sircar ..................................... | 95/98 X |
| 4,561,865 | 12/1985 | McCombs et al. .................... | 95/130 X |
| 4,572,723 | 2/1986 | Ward ...................................... | 95/96 |
| 4,576,614 | 3/1986 | Armond et al. ........................ | 95/96 X |
| 4,816,039 | 3/1989 | Krishnamurthy et al. .............. | 95/97 |
| 4,948,391 | 8/1990 | Noguchi ................................. | 55/26 |
| 5,032,150 | 7/1991 | Knaebel .................................. | 95/98 X |
| 5,228,888 | 7/1993 | Gmelin et al. .......................... | 95/96 |
| 5,370,728 | 12/1994 | LaSala et al. .......................... | 95/101 |
| 5,505,765 | 4/1996 | Kaji et al. ............................... | 95/100 |
| 5,518,526 | 5/1996 | Baksh et al. ............................ | 95/100 |
| 5,565,018 | 10/1996 | Baksh et al. ............................ | 95/100 |
| 5,620,501 | 4/1997 | Tamhankar et al. ................... | 95/96 X |
| 5,658,371 | 8/1997 | Smolarek et al. ...................... | 95/101 |
| 5,702,504 | 12/1997 | Schaub et al. .......................... | 95/101 |
| 5,772,737 | 6/1998 | Andreani et al. ....................... | 95/98 |
| 5,846,294 | 12/1998 | Doong ..................................... | 95/98 |
| 5,871,565 | 2/1999 | Leavitt ..................................... | 95/100 |

FOREIGN PATENT DOCUMENTS

0 537 831  4/1993  European Pat. Off. .

*Primary Examiner*—Robert Spitzer
*Attorney, Agent, or Firm*—Young & Thompson

[57] ABSTRACT

The device comprises an adsorber (1) and three outlet capacities (2–4), first (8, 9) and second (10, 11) structure to establish bidirectional communication between the adsorber and the elution capacity (2) and the repressurization capacity (3), respectively, and third structure (14A, 15; 16) to establish unidirectional communication from the adsorber to the production capacity (4).

6 Claims, 2 Drawing Sheets

6,071,328

PSA PROCESS AND APPARATUS FOR THE SEPARATION OF A GASEOUS MIXTURE

CROSS REFERENCE TO RELATED APPLICATION

This application corresponds to French application 97 07117 of Jun. 9, 1997, the disclosure of which is incorporated herein by reference.

FIELD OF THE INVENTION

The present invention relates to PSA apparatus for the separation of a gaseous mixture comprising an adsorber and at least one output capacity.

BACKGROUND OF THE INVENTION

Mono-adsorber PSAs generally comprise a single capacity, simple or of the so-called segregation type, or two capacities, also simple or of the so-called segregation type. Examples are described particularly in U.S. Pat. No. 4,561,865 (Greene & Kellogg), U.S. Pat. No. 4,948,391 (Vacuum Optics Corp.), U.S. Pat. No. 4,892,566 (Air Sep. Corp.), U.S. Pat. No. 5,370,728 (Praxair), U.S. Pat. No. 5,415,683 (Praxair), U.S. Pat. No. 5,565,018 (Praxair), EP 0 663 229 (Sumitomo Seika), EP 0 743 087 (L'Air Liquide). The solutions with a single capacity are preferable as to cost of equipment but do not permit optimization of the cycle nor volumes of gas to be stored. The solutions with capacities of the segregation type permit such optimizations but at the price of very high cost.

SUMMARY OF THE INVENTION

The present invention has for its object to provide a PSA apparatus and process for separation, permitting such optimizations at least cost.

To do this, according to one aspect of the invention, the apparatus comprises:

an adsorber having a supply inlet for a gaseous mixture and a gas outlet;

first, second and third capacities, the third capacity having an inlet and a gas outlet;

first means to establish bidirectional communication between the outlet of the adsorber and the first capacity;

second means to establish bidirectional communication between the outlet of the adsorber and the second capacity; and third means to establish unidirectional communication from the outlet of the adsorber toward the third capacity.

According to another aspect of the invention, the process for using such an apparatus, comprises the successive steps of production, deep pressurization, elution and recompression, or:

in the production step, the gas product at the outlet of the adsorber is brought by the second means to the second capacity and by the third means to the third capacity;

during the depressurization step, gas is brought from the outlet of the adsorber by the first means to the first capacity; and gas from the first and second capacities is brought sequentially by the first and second means, respectively, to the outlet of the adsorber during the steps of elution and recompression.

BRIEF DESCRIPTION OF THE DRAWINGS

Other characteristics and advantages of the present invention will become apparent from the following description of embodiments, given by way of illustration but in no way limiting, with respect to the accompanying drawings, in which.

DETAILED DESCRIPTION OF THE INVENTION

Figure 1:
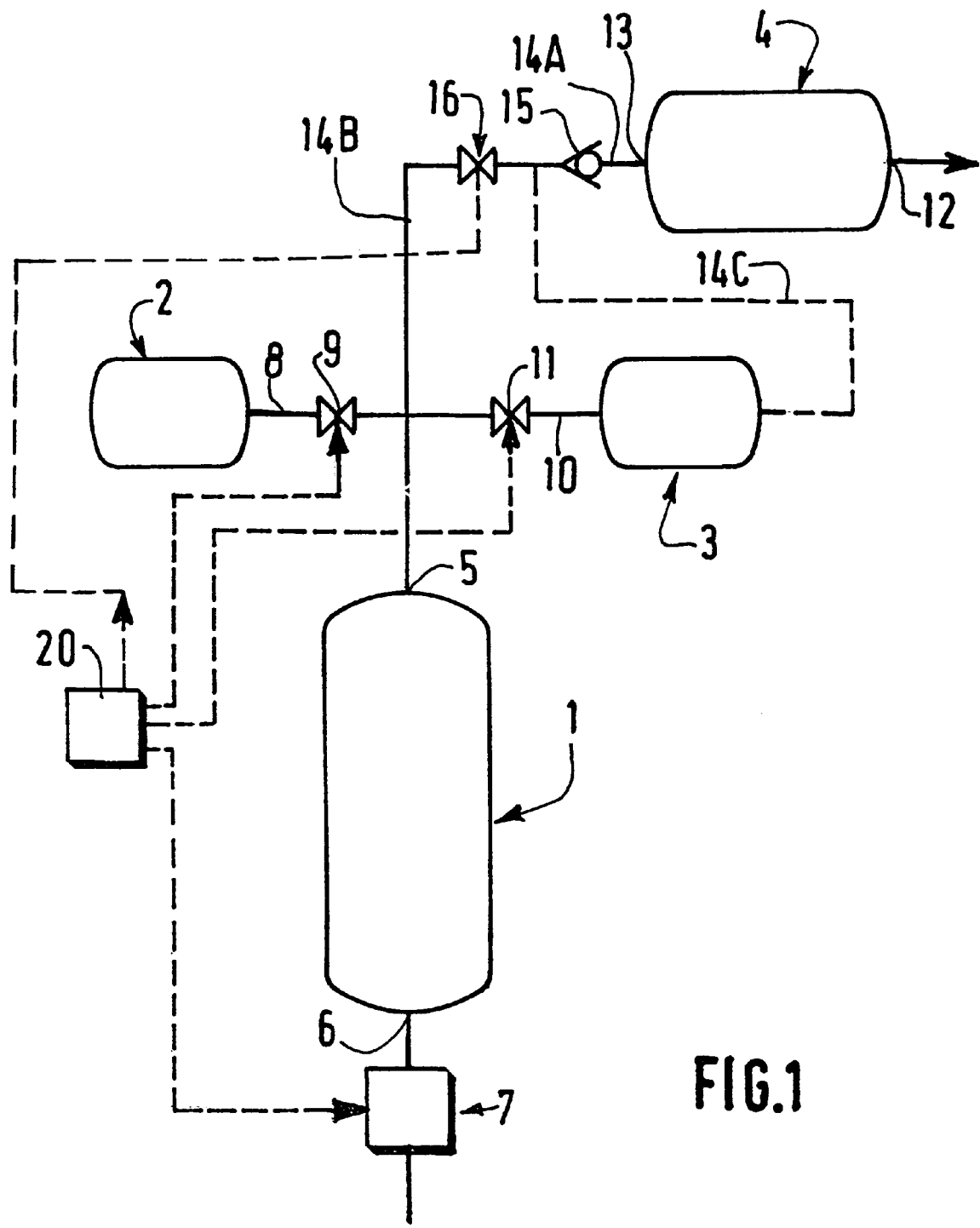
FIG. 1 is a schematic view of a mono-adsorber PSA apparatus with three capacities according to the invention.

In FIG. 1, there is seen a PSA apparatus for the separation of a gaseous mixture, typically for the production of oxygen from atmospheric air, comprising an adsorber 1 and three outlet capacities 2, 3 and 4 connectable respectively to the outlet of the adsorber 1, as will be seen further on. The inlet 6 of the adsorber 1 is connected to a compression/suction unit 7 with derivation valving as disclosed in U.S. Pat. No. 4,561,865 mentioned above or with a reversible rotary machine, as described in EP 0 743 087 mentioned above.

The first capacity 2 is connected to the outlet 5 by a line 8 comprising a valve 9. The second capacity 3 is connected to the outlet 5 by a line 10 provided with a valve 11.

The third capacity 4 comprises an outlet 12, or production outlet, connectable to a user circuit, and an inlet 13 connected to the outlet 5 of the adsorber 1. In the embodiment shown in broken lines in FIG. 1, the inlet 13 is connected to the outlet 5 by a first section 14A provided with a non-return valve 15 then by a second section 14B. The apparatus moreover comprises sequentially programmable control means 20 for the first (9) and second (11) communication means and of the unit 7.

Figure 2:
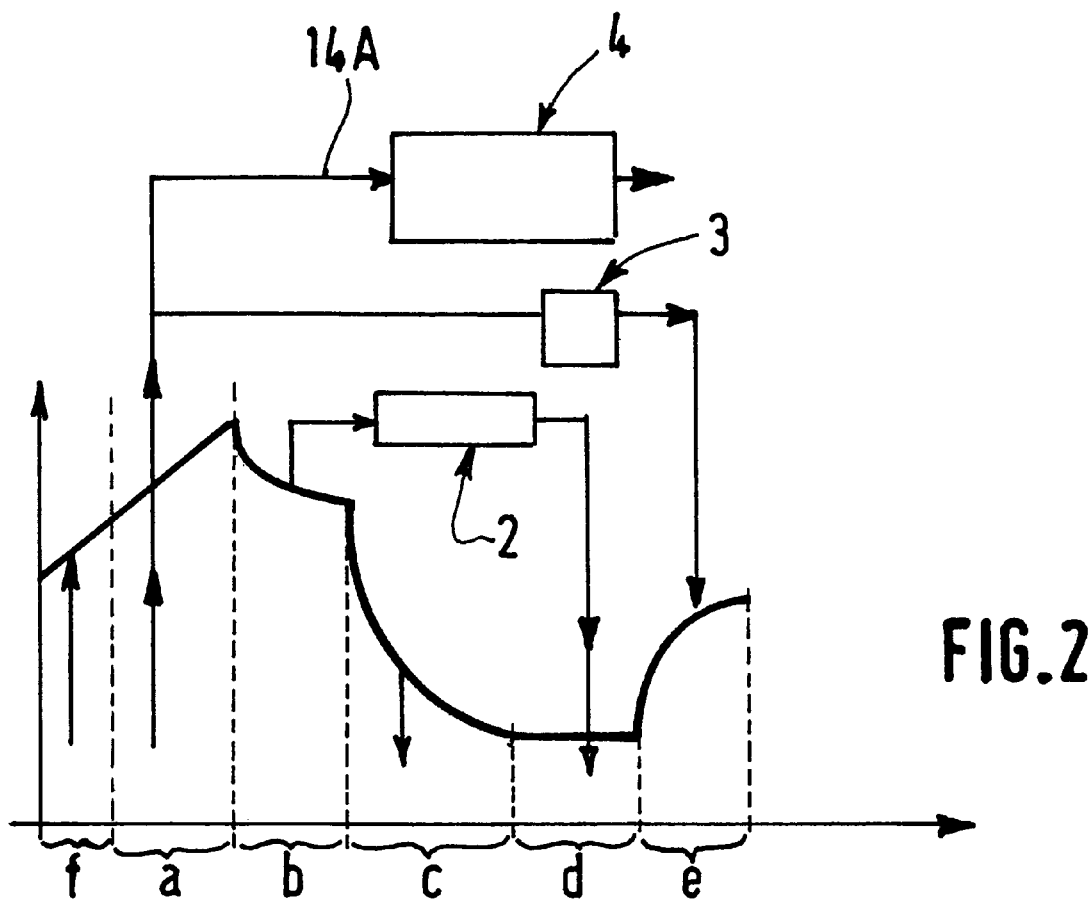
FIGS. 2 and 3 are examples of cycles according to the invention.

The operation of this apparatus will now be described with reference to FIG. 2 showing the phases of the PSA cycle.

As will be seen in this FIG. 2, the cycle comprises a) a production phase in which the system 7 sends to the adsorber 1 a pressure flow of gaseous mixture to be separated, the production gas separated being brought to the second and third capacities 3 and 4 (the valve 11 being open and the valve 9 closed).

b) a step in which the preceding adsorber in the production phase a) is subjected to a first co-current depressurization, the separated gas with falling purity being brought to the first reservoir 2 (the valve 9 being open and the valve 11 closed). The pressure in this phase being less than the pressure reached at the end of the production phase, the non-return valve 15 remains closed and the depressurization gas does not reach the production capacity 4.

c) a countercurrent depressurization phase, to the low pressure of the cycle, assisted by the system 7 operating as a pump.

d) an elution phase at the low pressure of the cycle by gas of medium purity from the first capacity 2 (the valve 9 being reopened).

e) an initial co-current repressurization phase by gas of high purity from the second capacity 3 (the valve 11 being open and the valve 9 being closed), the valve 15 preventing any return of the gas in the capacity 4 to a region of lower pressure.

f) a second pressurization phase by the gaseous mixture to be separated, without removal of production gas.

Such an arrangement permits reducing the dimensions of the storage capacities whilst permitting an elution/repressurization sequence by gas separated at increasing purity.

As a modification, the line 14B could comprise, in addition to or in place of the non-return valve 15, a third electrovalve 16 controlled by control means 20 in order, during the production phase a), to send the production gas sequentially first of all to the capacity 3 alone, and ultimately to the capacity 4 alone, the valve 16 being maintained closed beyond step a).

As a modification again, as shown in phantom line 14C on FIG. 1, the downstream section 14A incorporating the nonreturn valve 15 could be connected to the outlet 5, not directly but via the second capacity 3 and its connection line 10 (the portion of line 14B is in this case omitted).

Figure 3:
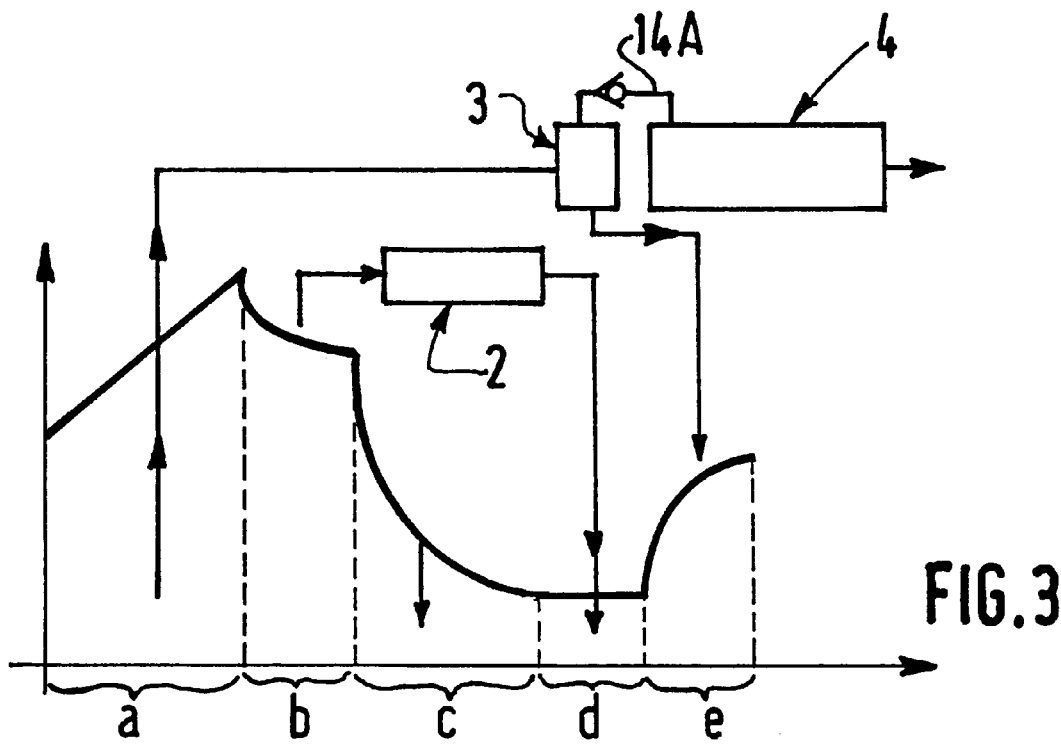

In FIG. 3, there has been shown the cycle transposed from that of FIG. 2 with this latter modification.

In the production phase a), all the production gas is sent to the small second capacity 2 and then, from there, to the third capacity 4. In phase e), upon the opening of the valve 11, the gas contained in the second capacity 3 returns to the adsorber 1 for its initial countercurrent repressurization, the one-way valve 15 preventing any return in the upstream direction of the production gas in the third capacity 4.

As a modification, the cycle shown in FIG. 3 comprises no intermediate step f) of repressurization by the single gaseous mixture to be separated, the phase a) of production, with the valve 11 open, leading directly to the initial repressurization phase e).

Although the present invention has been described in connection with particular embodiments, it is not thereby limited but on the contrary is susceptible to modifications and variations which will become apparent to a person skilled in the art.

What is claimed is:

1. A process for the separation of a gaseous mixture in a PSA device comprising an adsorber having an inlet for the gaseous mixture and a gas outlet for separated gas, and first, second and third capacities selectively connectable to said gas outlet, the process comprising a cycle including successive steps of production, depressurization, elution and repressurization, wherein:

during the production step, the separated gas available at the gas outlet is supplied simultaneously to the second capacity and to the third capacity;

during the depressurization step, the separated gas is transferred from the gas outlet to the first capacity;

during the step of elution, gas from the first capacity is transferred to the gas outlet of the adsorber;

during the step of repressurization, gas from the second capacity is transferred to the gas outlet; and no gas from the third capacity is returned to the adsorber.

2. The process of claim 1, wherein the depressurization step comprises a final sub-step of countercurrent depressurization to a low pressure of the cycle.

3. The process of claim 2, wherein the final sub-step of countercurrent depressurization follows a sub-step of depressurization toward the first capacity.

4. The process of claim 1, wherein the repressurization step comprises a sub-step of co-current repressurization by gaseous mixture only.

5. The process of claim 1, wherein the gaseous mixture is air.

6. The process of claim 1, wherein the gaseous mixture is air and oxygen is produced therefrom.

* * * * *